(12) United States Patent
Kim

(10) Patent No.: US 9,415,728 B2
(45) Date of Patent: Aug. 16, 2016

(54) DASH PAD FOR VEHICLE

(71) Applicant: HYUNDAI MOTOR COMPANY, Seoul (KR)

(72) Inventor: Min Su Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/693,720

(22) Filed: Apr. 22, 2015

(65) Prior Publication Data

US 2015/0307037 A1 Oct. 29, 2015

(30) Foreign Application Priority Data

Apr. 23, 2014 (KR) .................. 10-2014-0048447
Dec. 15, 2014 (KR) .................. 10-2014-0180237

(51) Int. Cl.
*E04B 1/86* (2006.01)
*B60R 13/08* (2006.01)
*G10K 11/168* (2006.01)

(52) U.S. Cl.
CPC .......... *B60R 13/0838* (2013.01); *G10K 11/168* (2013.01)

(58) Field of Classification Search
CPC ....................................... E04B 1/86
USPC ....................................... 181/290
See application file for complete search history.

(56) References Cited

U.S. PATENT DOCUMENTS

| | | | |
|---|---|---|---|
| 5,886,306 A * | 3/1999 | Patel et al. ............. | 181/290 |
| 2006/0065482 A1 | 3/2006 | Schmidft et al. | |
| 2008/0230309 A1* | 9/2008 | Fox et al. ............. | 181/286 |
| 2010/0219014 A1* | 9/2010 | Oosting et al. ............. | 181/290 |
| 2013/0098707 A1* | 4/2013 | Yamamoto et al. ............. | 181/290 |
| 2013/0112499 A1* | 5/2013 | Kitchen et al. ............. | 181/296 |
| 2013/0153330 A1* | 6/2013 | Fushiki ............. | 181/290 |
| 2014/0110963 A1* | 4/2014 | Kuroda et al. ............. | 296/39.3 |
| 2014/0158457 A1* | 6/2014 | Hanna ............. | 181/207 |
| 2014/0246268 A1* | 9/2014 | Fushiki ............. | 181/290 |
| 2015/0232044 A1* | 8/2015 | Demo et al. ............. | 181/290 |
| 2015/0314738 A1* | 11/2015 | Kim et al. ............. | 181/290 |

FOREIGN PATENT DOCUMENTS

| | | |
|---|---|---|
| JP | H09-109312 A | 4/1997 |
| JP | 2003-019930 A | 1/2003 |
| KR | 10-2005-0046208 A | 5/2005 |
| KR | 10-2013-0039363 A | 4/2013 |
| KR | 10-1308502 B1 | 9/2013 |
| KR | 10-1375442 B1 | 3/2014 |
| WO | 2011/077482 A1 | 6/2011 |
| WO | 2012/102345 A1 | 8/2012 |

* cited by examiner

*Primary Examiner* — Forrest M Phillips
(74) *Attorney, Agent, or Firm* — McDermott Will & Emery LLP

(57) ABSTRACT

A low-weight sound-absorbing dash pad for a vehicle includes a sound-absorbing/blocking multilayer bonded to a surface of a sound-absorbing member. The sound-absorbing/blocking multilayer is formed by sequentially bonding a first sound-absorbing layer, a sound-blocking layer, and a second sound-absorbing layer that are made of thermoplastic resin.

5 Claims, 7 Drawing Sheets

-Prior Art-

-Prior Art-

-Prior Art-

-Prior Art-

DASH PAD FOR VEHICLE

CROSS-REFERENCE TO RELATED APPLICATION

This application claims under 35 U.S.C. §119(a) the benefit of priority to Korean Patent Application Nos. 10-2014-0048447 and 10-2014-0180237 filed on Apr. 23, 2014 and Dec. 15, 2014, respectively, the entire contents of which are incorporated herein by reference.

TECHNICAL FIELD

The present invention relates to a low-weight sound-absorbing dash pad for a vehicle. More particularly, it relates to a low-weight sound-absorbing dash pad for a vehicle which has a structure formed by bonding at least three layers, where each layer is sound-absorbing, sound-blocking, or both sound-absorbing and sound-blocking.

BACKGROUND

In general, a dash panel is mounted at the boundary between an engine room and the interior of a vehicle and a dash pad that absorbs and blocks engine noise transmitted to the interior is mounted on the dash panel.

The dash pad blocks, removes, and absorbs engine noise and prevents high/low-frequency complex energy, which is generated in driving, from being transmitted to the interior of a vehicle.

Dash pads for a vehicle in the related art have structures formed by stacking different materials having different thicknesses and weight for the types of vehicles, as listed in the following Table 1.

TABLE 1

| Item | Existing dash pad (Arrangement: Sound-absorbing layer -> Sound-blocking layer) |
|---|---|
| 1 | PU(85K) + PA6 film (50 g) + TPE (2.5 t) + PET (1,000 g) [or Modified cross-section fiber (1,000 g)]: Large-size car<br>☞ PA6 film: To bond an sound-absorbing layer and a sound-blocking layer (functioning as an adhesive) |
| 2 | PU(85K) + PA6 film (50 g) + Hard PET(1,000 g): Small-sized car, gasoline<br>PU(85K) + H/Layer (1.5 t) + Hard PET(1,000 g): Small-sized car, diesel |
| 3 | PU(85K) + PA6 film (50 g) + Hard PET(800 g): RV gasoline<br>PU(85K) + EVA(2.0 t) + Hard PET(800 g): RV diesel |
| 4 | Soft PET + Hard PET |

The dash pads listed in Table 1, as illustrated in FIGS. 1A-1D, have a stacking structure of two to four layers from a sound-absorbing layer (engine room) to a sound-blocking layer (interior).

As described above, although the existing dash pads are manufactured in the structures formed by stacking different materials in two to four layers for the types of vehicles in order to improve sound-absorbing/blocking performance, PU material is generally used for the sound-absorbing layer and hard PET is generally stacked for the sound-blocking layer, so the weight and manufacturing costs are generally increased.

There is a need of a mold, a trimming mold, and a PU foaming mold for producing actual products, including a start mold and a mass production mold for examining performance in mass production, so the investment cost and manufacturing cost are increased. Further, there is a need of a film (PA6) for bonding the sound-absorbing layer and the sound-blocking layer, so the manufacturing cost and the number of processes are increased.

The above information disclosed in this Background section is only for enhancement of understanding of the background of the invention and therefore it may include information that does not form the prior art that is already known in this country to a person of ordinary skill in the art.

SUMMARY

The present disclosure has been made in an effort to solve problems associated with prior art.

An object of the present invention is to provide a low-weight sound-absorbing dash pad for a vehicle which has optimum sound-absorbing/blocking performance and light weight while reducing manufacturing cost and the number of processes, by bonding a sound-absorbing member made of microfibers and a sound-absorbing/blocking multilayer.

An embodiment of the present inventive concept provides a low-weight sound-absorbing dash pad for a vehicle which includes a sound-absorbing member made of microfibers bonded to a sound-absorbing/blocking multilayer made of thermoplastic resin. The sound-absorbing/blocking multilayer is formed by sequentially bonding a first sound-absorbing layer, a sound-blocking layer, and a second sound-absorbing layer that are made of thermoplastic resin.

In certain embodiments, the microfibers are obtained by twisting melt-blown polypropylene fibers and polypropylene staple fibers together in 100 to 330 g/m$^3$.

In certain embodiments, the sound-absorbing/blocking multilayer is formed by sequentially bonding Polyethylene terephthalate (PET), at least one of olefin-based resin and olefin-based thermoplastic elastomer (TPE), and Polyethylene terephthalate (PET).

In certain embodiments, the first sound-absorbing layer and the second sound-absorbing layer are selected from a group consisting of a needle punching material, plush PET formed by thermally twisting a low melting fiber and a PET fiber together, felt, and non-woven fabric. In certain embodiments, wherein the sound-absorbing/blocking multilayer has opposing first and second major surfaces, and gas transmission in a direction from the first major surface to the second major surface of the sound-absorbing/blocking multilayer is 0.1 to 30 (cm$^3$/cm$^2$·sec).

A method of manufacturing a sound-absorbing/blocking multilayer for a dash pad, includes:

supplying a first sound-absorbing member sheet from a skin fabric roller to a first pressing roller;

supplying a second sound-absorbing member sheet from a sound-absorbing fabric roller to a second pressing roller;

extruding a sound-blocking bonding resin between the first and second pressing rollers; and pressing the first sound-absorbing member sheet to the second sound-absorbing member sheet by a pressing force of the first and second pressing rollers, with the sound-blocking bonding resin between the first and second sound-absorbing members.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1A:
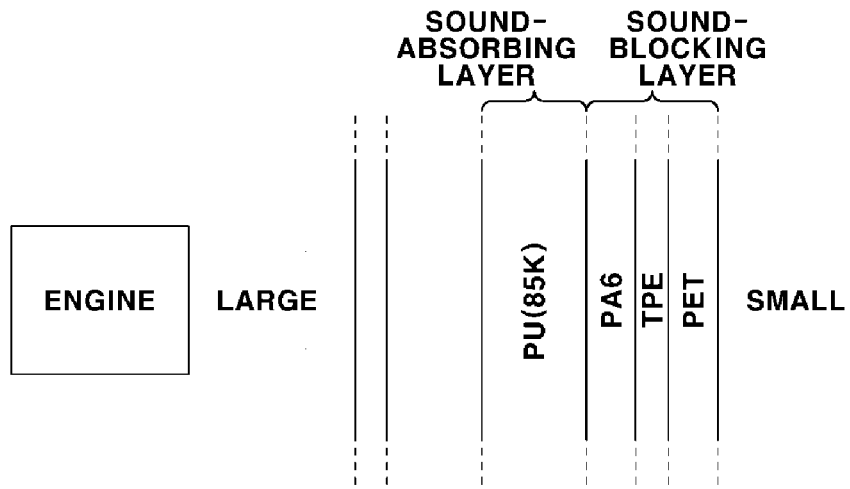
FIGS. 1A-1D are diagrams illustrating existing dash pad structures.
Figure 1B:
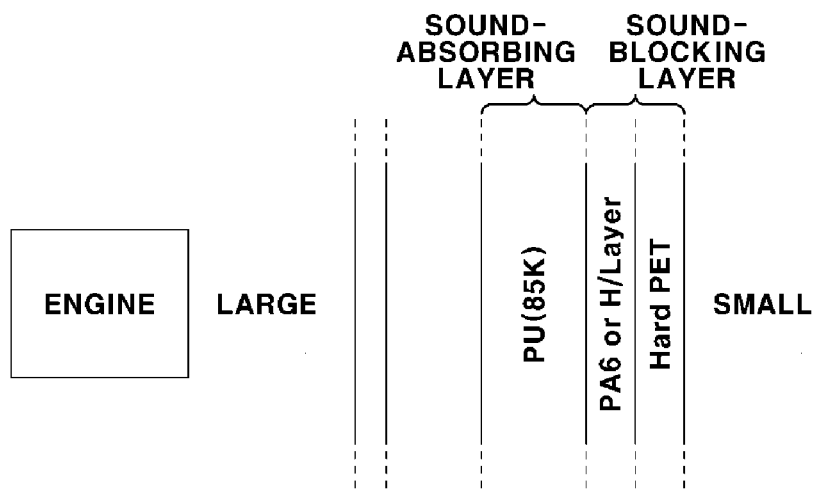
Figure 1C:
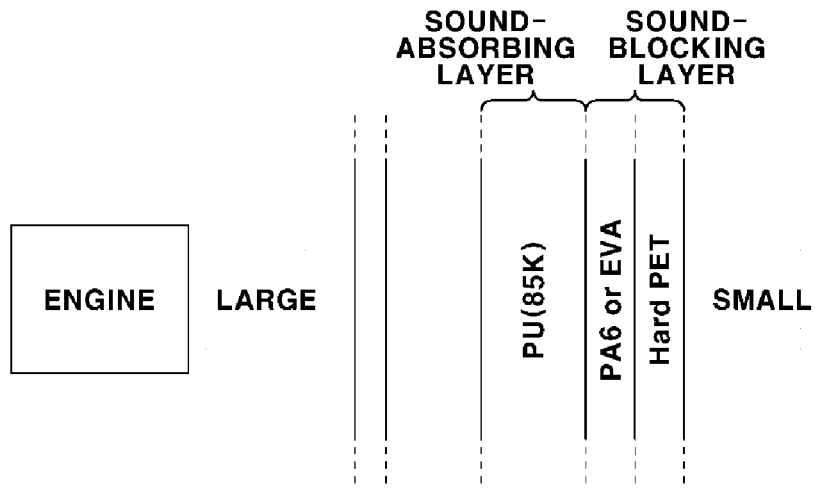
Figure 1D:
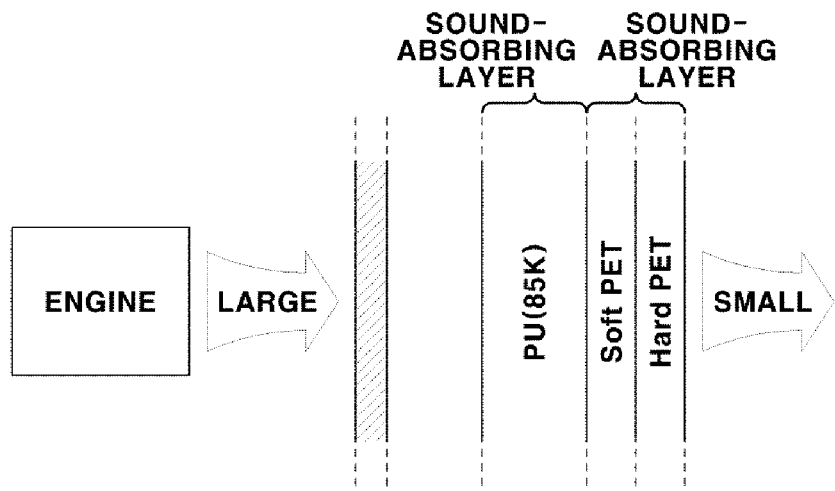

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present inventive concept, examples of which are illustrated in the accompanying drawings and described below. While the inventive concept will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (for example, fuels derived from resources other than petroleum). As referred to herein, a hybrid vehicle is a vehicle that has two or more sources of power, for example both gasoline-powered and electric-powered vehicles.

Hereinafter, embodiments of the present inventive concept will be described in detail with reference to the accompanying drawings.

Figure 2:
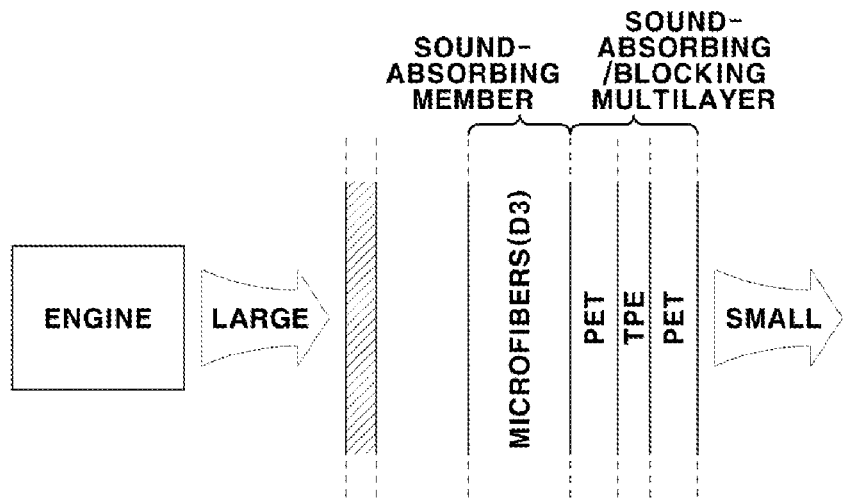
FIG. 2 is a diagram illustrating a low-weight sound-absorbing dash pad for a vehicle according to an embodiment of the present inventive concept.

Referring to FIG. 2, certain embodiments of the present inventive concept provide a dash pad that includes a sound-absorbing/blocking member attached to the dash panel in a vehicle. The sound absorbing/blocking member absorbs and blocks engine sound transmitted to the interior The dash pad has a structure formed by bonding a sound-absorbing/blocking multilayer to a surface of a sound-absorbing member made of microfibers. The sound-absorbing/blocking multilayer has a structure formed by sequentially bonding a first sound-absorbing layer, a sound-blocking layer, and a second sound-absorbing layer that, are made of thermoplastic resin.

In certain embodiments, the microfibers selected for the sound-absorbing member (close to the engine room) are made by twisting melt-blown polypropylene fibers and polypropylene staple fibers together in 100 to 1,000 g/m$^2$.

In more detail, when a melt-blown polypropylene fiber is released, like scattering, down on a die wound with a melt-blown polypropylene fiber, by supplying air pulsing to the melt-blown polypropylene fiber at a side and blowing a polypropylene staple fiber to the melt-blown polypropylene fiber at the other side, microfibers of 100 to 1,000 g/m$^2$ made by twisting a melt-blown polypropylene fiber and a polypropylene staple fiber together are provided.

The sound-absorbing/blocking multilayer is manufactured by stacking thermoplastic resin in three layers, that is, sequentially stacking the first sound-absorbing layer, the sound-blocking layer, and the second sound-absorbing layer.

In certain embodiments, in the sound absorbing/blocking multilayer, the first sound-absorbing layer is made of polyethylene terephthalate (PET), the sound-blocking layer is made of one or more of olefin-based resin or olefin-based thermoplastic elastomer (TPE), and the second sound-absorbing layer is made of polyethylene terephthalate (PET).

For reference, thermoplastic resin, which is resin that can be deformed by heating again, even after it is formed by heating, has an advantage that it can be efficiently machined by extrusion molding or injection molding, and is made of a macromolecular substance that has a property of becoming a fluid by plastic deformation when it is heated and of reversibly hardening when it is cooled back.

Figure 5:
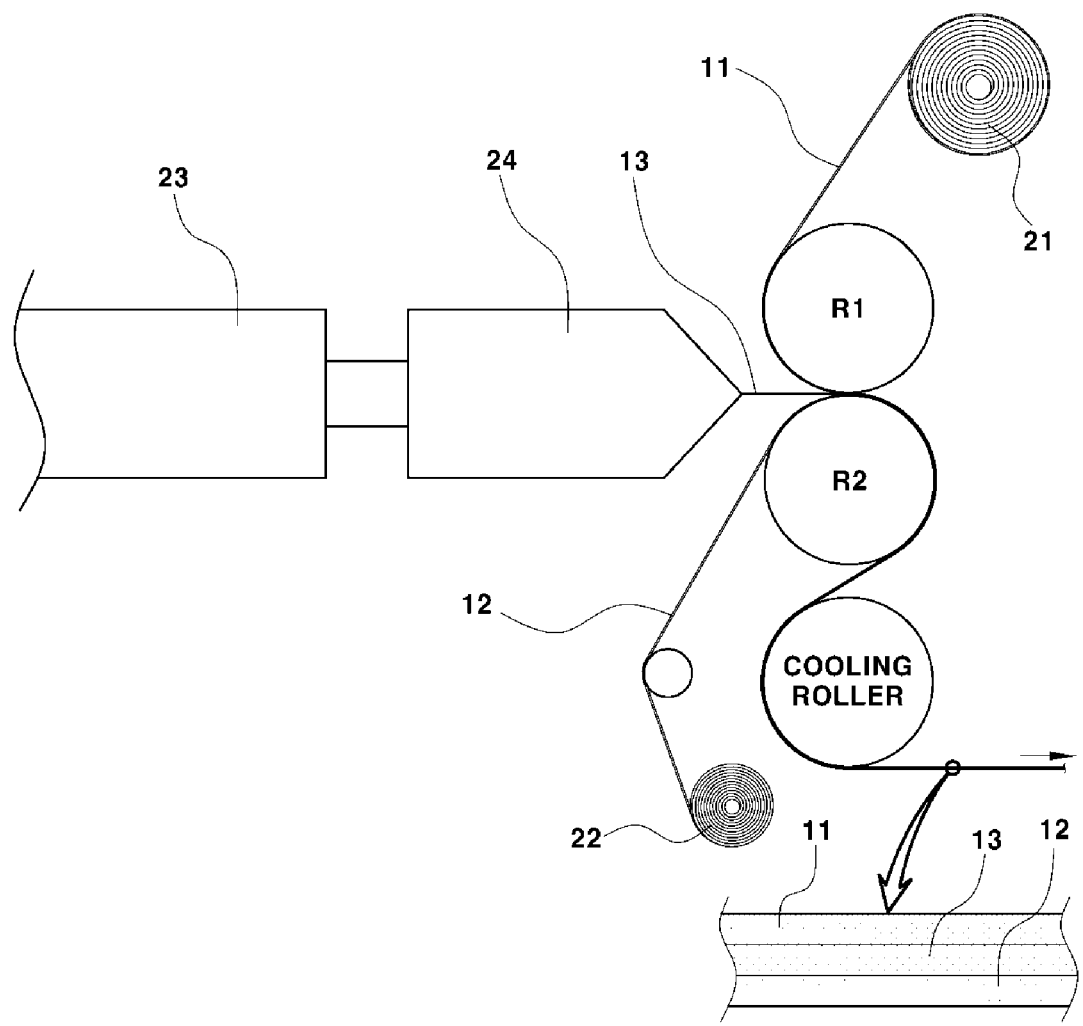
FIG. 5 is a schematic view illustrating a method of manufacturing a sound-absorbing/blocking multilayer of a low-weight sound-absorbing dash pad for a vehicle according to an embodiment of the present inventive concept.

A process of manufacturing a sound-absorbing/blocking multilayer of an embodiment of the present inventive concept which has the properties of thermoplastic resin is described hereafter with reference to FIG. 5.

In certain embodiments of the sound-absorbing/blocking multilayer, the first sound-absorbing layer is a first sound-absorbing member sheet 11 made of polyethylene terephthalate (PET), the sound-blocking layer is a bonding resin 13 made of at least one of olefin-based resin or olefin-based thermoplastic elastomer (TPE), and the second sound-absorbing layer is a second sound-absorbing member sheet 12 made of polyethylene terephthalate (PET).

The first sound-absorbing member sheet 11 is supplied from a skin fabric roller 21 to a first pressing roller R1, the second sound-absorbing member sheet 12 is supplied from a sound-absorbing fabric roller 22 to a second pressing roller R2, and the bonding resin 13 is supplied from a T-die 24 of an extruder 23 to between the first and second pressing rollers R1 and R2.

Accordingly, the first sound-blocking member sheet 11 and the second sound-blocking member sheet 12 are bonded by pressing force of the first and second pressing rollers R1 and R2 with the bonding resin 13 therebetween, thereby achieving the sound-blocking member according to an embodiment of the present inventive concept.

The porosity, which is determines the transmission of a gas, of the sound-absorbing/blocking layer may depend on the pressing force of the first and second pressing rollers, and the gas transmission of the sound-absorbing/blocking layer may be set to 0.1 to 30 ($cm^3/cm^2 \cdot sec$) in the thickness direction.

in certain embodiments, the first sound-absorbing layer and the second sound-absorbing layer may be a needle punching material, plush PET formed by thermally twisting a low melting fiber and a PET fiber together, felt, or non-woven fabric. Hereafter, embodiments of the present inventive concept are described in more detail with Comparative Examples, but the present inventive concept is not limited by the following examples.

Microfibers are available in a number of grades, some of which are listed in Table X below. It should be noted that Table X shows only a few examples of commonly used grades of microfibers. However, the microfibers included in the scope of the claims are not limited to those in Table X. For reference, the terms 'D1,' 'D2,' and 'D3' indicate the grade of microfibers, the term 'D1' means 130 g per area ($m^2$), the term 'D2' means 230 g per area ($m^2$), and the term 'D3' means 330 g per area ($m^2$).

TABLE X

| Grade of Microfibers | Weight($g/m^2$) |
|---|---|
| D1 | 130 |
| D2 | 230 |
| D3 | 330 |

In Table 2, the term 'D3 (high)' means that the microfibers are arranged at the inflow side of noise and the term 'D3 (low)' means that the microfibers are arranged at the opposite side to the inflow side of noise.

TABLE 2

| | Size | Remark |
|---|---|---|
| Comparative example 1 | 840 mm × 840 mm | PET + TPE + PU(high) |
| Comparative example 2 | 840 mm × 840 mm | PET + TPE + PU(low) |
| Example 3A | 840 mm × 840 mm | PET + TPE + D3(high) |
| Example 3B | 840 mm × 840 mm | PET + TPE + D3(low) |
| Example 4 | 840 mm × 840 mm | PET + TPE + PET + D3(high) |
| Example 5 | 840 mm × 840 mm | PET + TPE + PET + D3(low) |

Comparative Examples 1 and 2

As Comparative Examples 1 and 2, a dash pad having a size of 840 mm×840 mm was manufactured by sequentially stacking polyethylene terephthalate (PET), thermoplastic elastomer (TPE), and polyurethane (PU).

In Table 2, the term 'PU (high)' means that polyurethane (PU) is arranged at the inflow side of noise and the term 'PU (low)' means that polyurethane (PU) is arranged at the opposite side to the inflow side of noise.

Examples 3A and 3B

As Example 3A, a dash pad having a size of 840 mm×840 mm was manufactured by sequentially stacking polyethylene terephthalate (PET), thermoplastic elastomer (TPE), and microfibers (D3), with microfibers (D3) arranged at the inflow side of noise.

As Example 3B, a dash pad having a size of 840 mm×840 mm was manufactured by sequentially stacking polyethylene terephthalate (PET), thermoplastic elastomer (TPE), and microfibers (D3), with microfibers (D3) arranged at the opposite side to the inflow side of noise.

Examples 4 and 5

As Example 4, a dash pad having a size of 840 mm×840 mm was manufactured by sequentially stacking polyethylene terephthalate (PET), thermoplastic elastomer (TPE), and polyethylene terephthalate (PET), and microfibers (D3). Microfibers (D3) were arranged at the inflow side of noise.

As in Example 4 described above, in Example 5, a dash pad having a size of 840 mm×840 mm was manufactured by sequentially stacking microfibers (D3) for a sound-absorbing member, and polyethylene terephthalate (PET), thermoplastic elastomer (TPE), and polyethylene terephthalate (PET) for a sound-blocking member. However, Example 5 differs from Example 4 in that the structure was turned over so that the microfibers (D3) were arranged at the opposite side to the inflow side of noise.

For reference, the term 'D3 (low)' in Table 2 means that the microfibers (D3) are arranged at the opposite side to the inflow side of noise.

Test 1—Sound-Absorbing Effect

A sound-absorbing ratio was tested, using Alpha Cabin Measurement: Absorption in order to examine a sound-absorbing effect of the dash pads according to the Examples and Comparative Examples and the results are listed in Table 3 and illustrated in FIG. 3.

TABLE 3

| Item | 400 | 500 | 630 | 800 | 1 k | 1.25 k | 1.6 k | 2 k | 2.5 k | 3.15 k | 4 k | 5 k | 6.3 k | 8 k | 10 k |
|---|---|---|---|---|---|---|---|---|---|---|---|---|---|---|---|
| Comparative example 1 | 0.62 | 0.75 | 0.80 | 0.89 | 0.95 | 1.04 | 0.96 | 0.89 | 0.62 | 0.78 | 0.62 | 0.65 | 0.67 | 0.68 | 0.52 |
| Comaprative example 2 | 0.26 | 0.31 | 0.21 | 0.29 | 0.28 | 0.31 | 0.32 | 0.34 | 0.44 | 0.62 | 0.50 | 0.57 | 0.57 | 0.63 | 0.67 |
| Example 3A | 0.63 | 1.05 | 0.94 | 1.11 | 1.25 | 1.35 | 1.29 | 1.11 | 1.18 | 1.08 | 1.02 | 1.08 | 1.00 | 1.07 | 0.95 |
| Example 3B | 0.33 | 0.35 | 0.25 | 0.36 | 0.31 | 0.32 | 0.36 | 0.35 | 0.38 | 0.61 | 0.45 | 0.69 | 0.53 | 0.59 | 0.79 |
| Example 4 | 0.60 | 1.06 | 1.05 | 1.19 | 1.27 | 1.30 | 1.32 | 1.17 | 1.19 | 1.10 | 0.90 | 0.93 | 1.04 | 1.04 | 0.89 |
| Example 5 | 0.82 | 0.70 | 0.68 | 0.58 | 0.53 | 0.46 | 0.50 | 0.46 | 0.49 | 0.55 | 0.47 | 0.63 | 0.55 | 0.53 | 0.33 |

Figure 3:
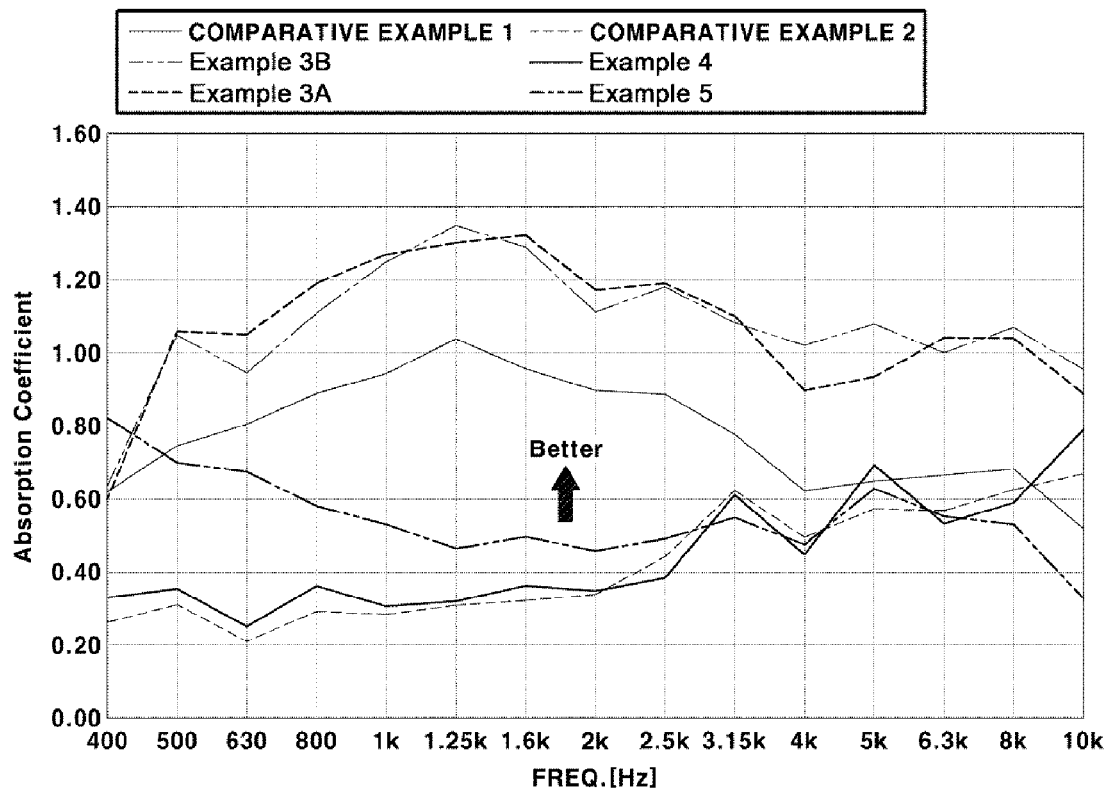
FIG. 3 is a graph illustrating a sound-absorbing test result of a low-weight sound-absorbing dash pad for a vehicle according to an embodiment of the present inventive concept.

As listed in Table 3 and illustrated in FIG. 3, it was found that the sound-absorbing ratio of the dash pad according to an embodiment of the present invention, that is, the dash pad formed by sequentially stacking PET+TPE+PET+D3 (high) was higher than those in the Comparative Examples.

Test 2—Sound-Blocking Effect

In order to examine sound-blocking effects of the dash pads according to Examples and Comparative Examples, the sound transmission loss ratio was tested by APA MAT TEST: STL (Sound trans loss) and the results are listed in the following Table 4 and illustrated in the following FIG. 4.

TABLE 4

| Item | 400 | 500 | 630 | 800 | 1 k | 1.25 k | 1.6 k | 2 k | 2.5 k | 3.15 k | 4 k | 5 k | 6.3 k | 8 k |
|---|---|---|---|---|---|---|---|---|---|---|---|---|---|---|
| Comparative example 1 | 19.30 | 23.70 | 18.90 | 32.40 | 31.80 | 37.10 | 40.30 | 45.70 | 47.00 | 48.20 | 40.60 | 46.20 | 40.70 | 39.00 |
| Comparactive example 2 | 23.10 | 28.40 | 29.00 | 31.00 | 36.40 | 38.80 | 37.80 | 38.20 | 39.10 | 41.20 | 35.50 | 39.80 | 34.30 | 27.80 |
| Example 3A | 21.00 | 26.50 | 21.00 | 36.80 | 39.10 | 37.50 | 39.90 | 42.80 | 43.90 | 45.50 | 38.70 | 43.50 | 38.50 | 36.30 |
| Example 3B | 18.40 | 28.30 | 29.50 | 32.10 | 39.60 | 40.40 | 36.40 | 37.20 | 38.10 | 40.40 | 34.60 | 38.60 | 33.70 | 27.90 |
| Example 4 | 16.50 | 23.50 | 17.70 | 27.20 | 21.80 | 29.00 | 30.90 | 38.40 | 35.70 | 37.50 | 41.20 | 42.60 | 38.40 | 41.10 |
| Example 5 | 10.70 | 20.60 | 19.70 | 20.80 | 28.60 | 33.80 | 32.50 | 33.90 | 34.20 | 36.90 | 33.90 | 37.10 | 32.70 | 27.50 |

Figure 4:
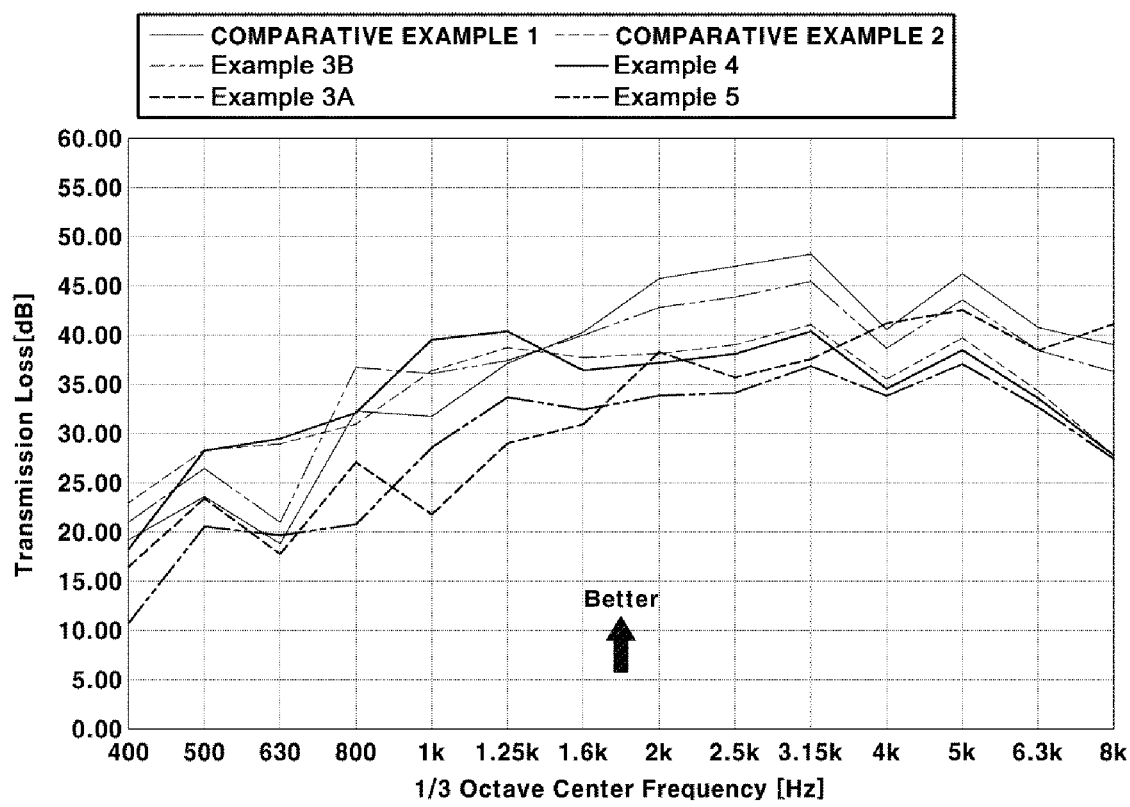
FIG. 4 is a graph illustrating a sound-blocking test result of a low-weight sound-absorbing dash pad for a vehicle according to an embodiment of the present inventive concept.

As listed in Table 4 and illustrated in FIG. 4, it was found that the sound transmission loss ratio of the dash pad according to an embodiment of the present invention, that is, the dash pad formed by sequentially stacking PET+TPE+PET+D3 (high) maintains a substantially equivalent level to those in the Comparative Examples, there are differences in the sections though.

Test 3

Sound-absorbing performance according to differences of porosity of the dash pad according to an embodiment of the present invention, that is, the dash pad manufactured by sequentially stacking PET+TPE+PET+D3 (high), that is, sound-absorbing performance according to differences of gas transmission of a sound-absorbing/blocking layer (PET+TPE+PET) was tested and the results are listed in the following Table 5 and illustrated in the following FIG. 6.

The gas transmission of the sound-absorbing/blocking layer was divided into 'Large [7 to 12 ($cm^3/cm^2 \cdot sec$)] and 'small [6 to 10 ($cm^3/cm^2 \cdot sec$)] in the tests.

TABLE 5

| Item | 400 | 500 | 630 | 800 | 1 k | 1.25 k | 1.6 k | 2 k | 2.5 k | 3.15 k | 4 k | 5 k | 6.3 k | 8 k | 10 k |
|---|---|---|---|---|---|---|---|---|---|---|---|---|---|---|---|
| Embodiment [sound-absorbing/blocking multilayer (porosity 6~10) + sound-absorbing member(microfibers)] | 0.31 | 0.25 | 0.34 | 0.37 | 0.49 | 0.48 | 0.52 | 0.89 | 0.65 | 0.59 | 0.83 | 0.91 | 0.96 | 0.97 | 1.04 |
| Embodiment [sound-absorbing/blocking multilayer (porosity 7~12) + sound-absorbing member(microfibers)] | 0.32 | 0.41 | 0.42 | 0.50 | 0.59 | 0.52 | 0.55 | 0.58 | 0.69 | 0.73 | 0.83 | 0.85 | 0.93 | 0.80 | 1.05 |

Figure 6:
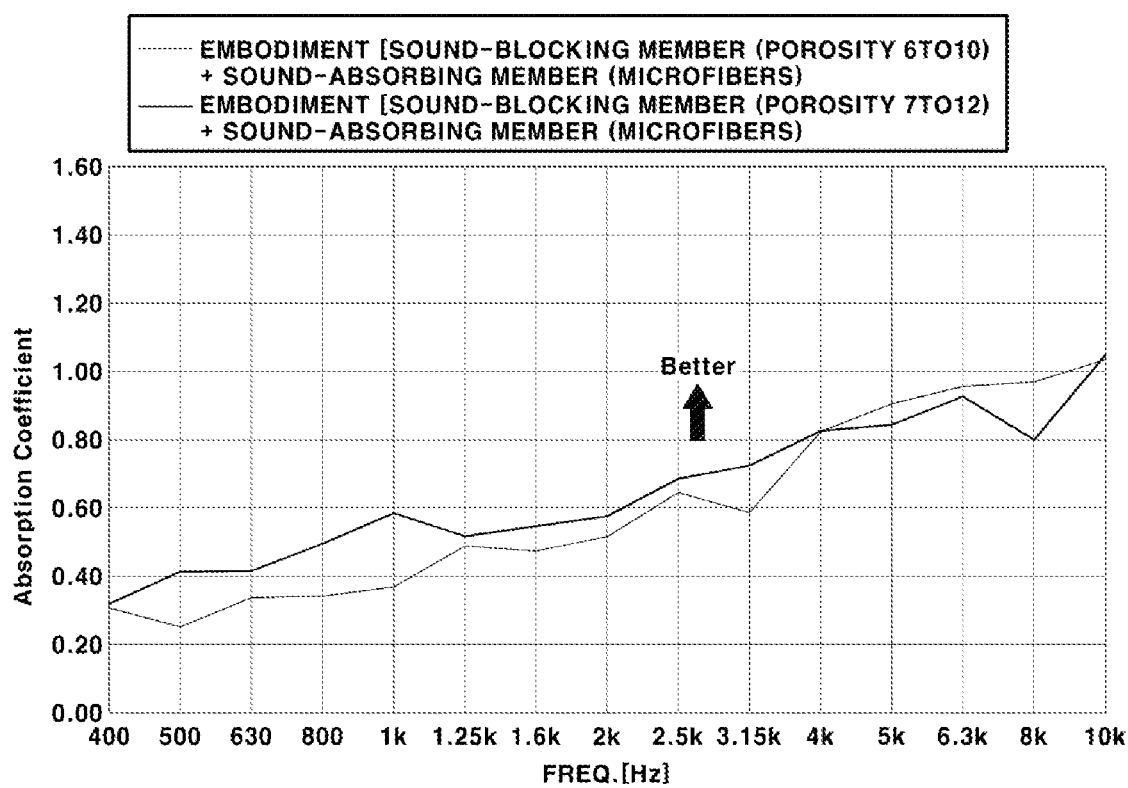
FIGS. 6 and 7 are graphs illustrating a sound-absorbing test result according to porosity of a sound-blocking member in a low-weight sound-absorbing dash pad for a vehicle according to an embodiment of the present inventive concept.

As listed in Table 5 and illustrated in FIG. 6, it was found that the higher the gas transmission of the sound-blocking members, the higher the sound-absorbing performance at 4 kHz or less, which is a road noise concern section.

Test Example 4

Sound-absorbing performance according to a difference in gas transmission was tested only on sound-absorbing members, that is, sound-absorbing members without microfibers (PET+TPE+PET) in the dash pad and the results are listed in the following Table 6 and illustrated in the following FIG. 7.

The gas transmission of the sound-absorbing/blocking layer was divided into 'Large [7 to 12 ($cm^3/cm^2 \cdot sec$)] and 'small [6 to 10 ($cm^3/cm^2 \cdot sec$)] in the tests.

TABLE 6

| Item | 400 | 500 | 630 | 800 | 3.15 k | 4 k | 5 k | 6.3 k | 8 k | 10 k |
|---|---|---|---|---|---|---|---|---|---|---|
| Sound-absorbing/blocking multilayer (porocity 6~10) | 0.29 | 0.29 | 0.30 | 0.28 | 0.37 | 0.53 | 0.48 | 0.97 | 0.84 | 1.14 |
| Sound-absorbing/blocking multilayer (porocity 7~12) | 0.33 | 0.34 | 0.35 | 0.52 | 0.44 | 0.53 | 0.42 | 0.76 | 0.72 | 0.61 |

Figure 7:
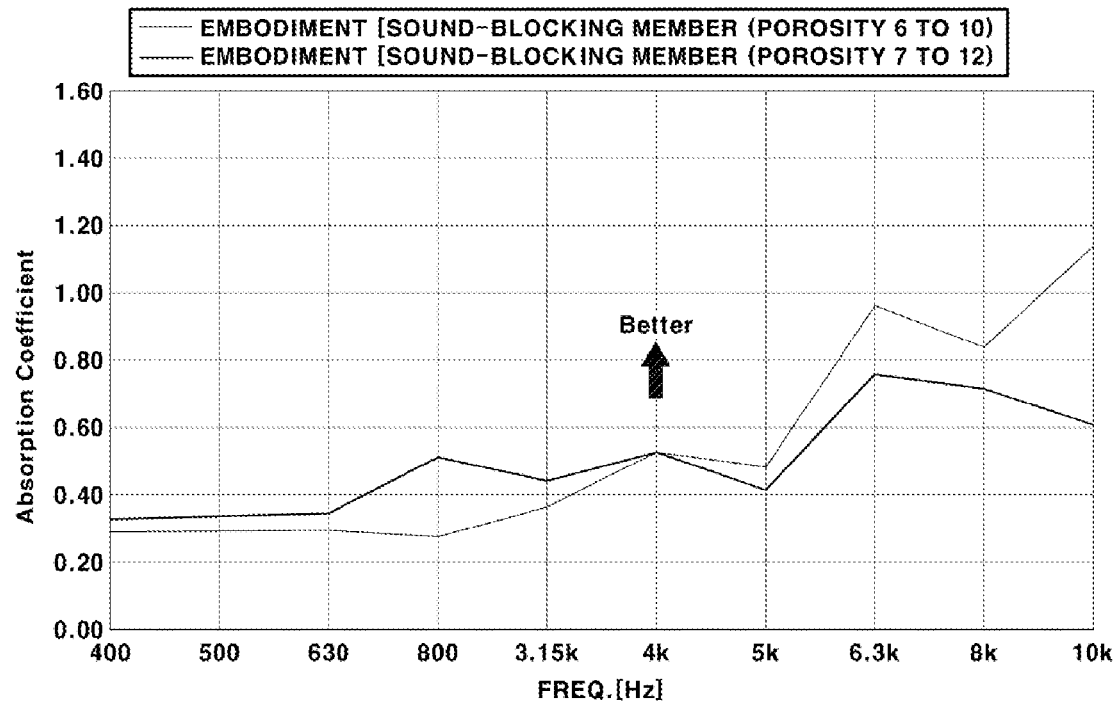

As listed in Table 6 and illustrated in FIG. 7, it was found that the higher the gas transmission of the sound-absorbing/blocking layer, the higher the sound-absorbing performance at 4 kHz or less, which is a road noise concern section.

Test 5

Sound-blocking performance according to a difference in gas transmission was tested only on a sound-absorbing/blocking multilayer (PET+TPE+PET) without microfibers in the dash pad according to an embodiment of the present inventive concept and the results are listed in the following Table 7 and illustrated in the following FIG. 8.

The gas transmission of the sound-absorbing/blocking multilayer was divided into 'Large [7 to 12 (cm$^3$/cm$^2$·sec)] and 'small [6 to 10 (cm$^3$/cm$^2$·sec)] in the tests.

TABLE 7

| Item | 400 | 500 | 630 | 800 | 1 k | 1.25 k | 1.6 k | 2 k | 2.5 k | 3.15 k | 4 k | 5 k | 6.3 k | 8 k |
|---|---|---|---|---|---|---|---|---|---|---|---|---|---|---|
| Invention [sound-absorbing/blocking multilayer (porocity 6~10)] | 10.50 | 13.70 | 11.80 | 20.40 | 20.00 | 16.70 | 21.40 | 18.80 | 21.30 | 23.10 | 21.50 | 23.80 | 25.70 | 21.70 |
| Invention [sound-absorbing/blocking multilayer (porocity 7~12)] | 11.40 | 13.50 | 11.80 | 20.00 | 19.90 | 16.70 | 21.60 | 18.70 | 21.30 | 23.60 | 22.20 | 25.40 | 26.20 | 21.70 |

Figure 8:
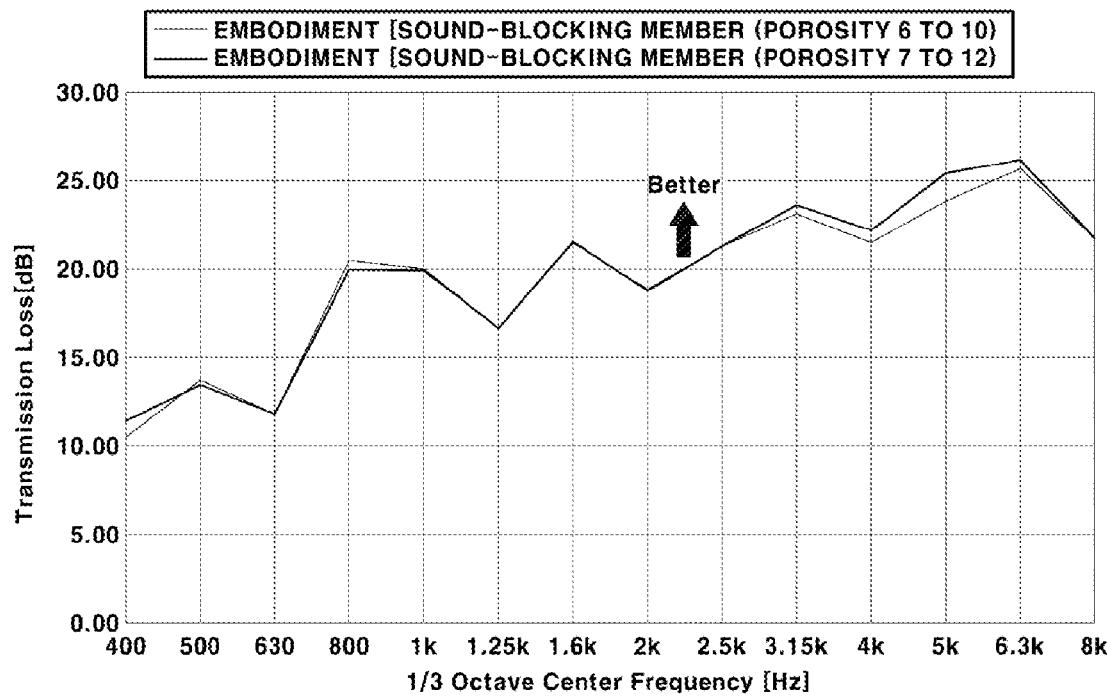
FIG. 8 is a graph illustrating a sound-blocking test result according to porosity of a sound-blocking member in a low-weight sound-absorbing dash pad for a vehicle according to an embodiment of the present inventive concept.

As listed in Table 7 and illustrated in FIG. 8, it was found that the sound-blocking performance of the sound-blocking members is at an equivalent level regardless of the degree of gas transmission.

As described above, by providing a dash pad manufactured by bonding microfibers just of 100 to 1000 g per area (m$^3$) for a sound-absorbing member to a porous sound-blocking member having a multilayer structure, it is possible to maximize sound-absorbing/blocking performance using sound absorption of the microfibers and to further improve sound-absorbing performance by adjusting the gas transmission of the sound-blocking member.

Certain embodiments of the present inventive concept provide the following effects.

First, in certain embodiments, by bonding microfibers just of 100 to 330 g per area (m$^3$) for a sound-absorbing member to a porous sound-absorbing/blocking multilayer, it is possible to maximize sound-absorbing/blocking performance and reduce the weight, using sound-absorbing performance of microfibers.

Second, in certain embodiments, since microfibers are used instead of polyurethane for the sound-absorbing member, there is no need of a polyurethane foaming mold, and accordingly, productivity can be improved and manufacturing cost can be reduced.

Third, in certain embodiments, there is no need of PA6 film and a bonding process for bonding a sound-absorbing layer and a sound-blocking layer which are used in the related art, so it is possible to reduce the manufacturing cost and the number of processes.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A low-weight sound-absorbing dash pad for a vehicle, comprising: a sound-absorbing member made of microfibers, and a sound-absorbing/blocking multilayer bonded to a surface of the sound-absorbing member, wherein the sound-absorbing/blocking multilayer including a first sound-absorbing layer, a sound-blocking layer, and a second sound-absorbing layer that are made of thermoplastic resin and are sequentially bonded,
wherein the microfibers are obtained by twisting melt-blown polypropylene fibers and polypropylene staple fibers together in 100 to 1000 g/m$^2$.

2. The low-weight sound-absorbing dash pad for a vehicle of claim 1, wherein the first sound-absorbing layer is made of polyethylene terephthalate (PET), the sound-blocking layer is made of at least one of olefin-based resin and olefin-based thermoplastic elastomer (TPE), and the second sound-absorbing layer is made of polyethylene terephthalate (PET).

3. The low-weight sound-absorbing dash pad for a vehicle of claim 1, wherein first sound-absorbing layer and the second sound-absorbing layer are selected from a group consisting of a needle punching material, plush PET formed by thermally twisting a low melting fiber and a PET fiber together, felt, and non-woven fabric.

4. The low-weight sound-absorbing dash pad for a vehicle of claim 1, wherein the sound-absorbing/blocking multilayer has opposing first and second major surfaces, and gas transmission in a direction from the first major surface to the second major surface of the sound-absorbing/blocking multilayer is 0.1 to 30 (cm.sup.3/cm.sup.2 sec).

5. A method of manufacturing a low-weight sound-absorbing dash pad, the method comprising:
providing a sound-absorbing member made of microfibers;
supplying a first sound-absorbing member sheet from a skin fabric roller to a first pressing roller;
supplying a second sound-absorbing member sheet from a sound-absorbing fabric roller to a second pressing roller;
extruding a sound-blocking bonding resin between the first and second pressing rollers; and
pressing the first sound-absorbing member sheet to the second sound-absorbing member sheet by a pressing force of the first and second pressing rollers, with the sound-blocking bonding resin between the first and second sound-absorbing members, to make a sound-absorbing/blocking multilayer; and
bonding the sound-absorbing/blocking multilayer to a surface of the sound-absorbing member,
wherein the microfibers are obtained by twisting melt-blown polypropylene fibers and polypropylene staple fibers together in 100 to 1000 g/m$^2$, when the melt-blown polypropylene fibers are released, like scattering, down on a die wound with a melt-blown polypropylene fiber, by supplying air pulsing to the melt-blown polypropylene fiber at a side and blowing a polypropylene staple fiber to the melt-blown polypropylene fiber at the other side.

* * * * *